(12) United States Patent
Noland (10) Patent No.: US 6,272,910 B1
(45) Date of Patent: *Aug. 14, 2001

(54) CAMSHAFT DEGREEING PLATFORM

(76) Inventor: E. Bruce Noland, 205 Wildman St., NE., Leesburg, VA (US) 22075

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,446

(22) Filed: Dec. 23, 1997

Related U.S. Application Data

(63) Continuation-in-part of application No. 08/856,507, filed on May 15, 1997, now Pat. No. 5,827,954.

(51) Int. Cl.[7] .................................................. G01M 15/00
(52) U.S. Cl. .............................. 73/116; 73/119 R; 33/519; 33/600; 33/606; 33/611
(58) Field of Search ................................ 73/46, 47, 49.7, 73/116, 119 R; 33/519, 600, 606, 611

(56) References Cited

U.S. PATENT DOCUMENTS

| 2,471,746 |   | 5/1949 | Hilbert . | |
|-----------|---|--------|-----------|---|
| 2,521,966 |   | 9/1950 | Clayborne . | |
| 2,776,494 |   | 1/1957 | Sheppard . | |
| 2,782,518 |   | 2/1957 | Tieman . | |
| 2,851,782 |   | 9/1958 | Kollmann . | |
| 3,158,941 | * | 12/1964 | Komstadius | 33/174 |
| 3,234,655 | * | 2/1966 | Skeels et al. | 33/174 |
| 3,486,236 | * | 12/1969 | Bennett | 33/174 |
| 4,204,331 | * | 5/1980 | Wertepny et al. | 33/172 R |
| 4,372,156 | * | 2/1983 | Meismer | 73/119 R |
| 4,580,446 |   | 4/1986 | Ansteth . | |
| 4,730,958 | * | 3/1988 | Banoczky | 408/54 |
| 5,459,940 |   | 10/1995 | McKenzie . | |
| 5,533,384 | * | 7/1996 | Pierce et al. | 73/47 |
| 5,827,954 | * | 10/1998 | Noland | 73/116 |

OTHER PUBLICATIONS

Race Proven Moroso® Performance Products, 1997 Catalog, p. 112, part #62170, "Smokey Yunick–Style Dial Indicator Stand".

Moroso® Installation Instructions. P/N 62170 Yunick–Moroso Dual Dial Indicator Stand. 1997.

Article from Internet, "Mechanical Gaging" (no date available).

Article from Internet, "Camshaft Selection Guide" (no date available).

Article from Internet, "Basic Camshaft Installation Techniques" (no date available).

Lunati Cams sales flyer, "Lifter Installation and Valve Adjustment for Hydraulic and Mechanical Lifter Camshafts" (no date available).

"How To Hot Rod Small–Block Chevys", 1976.

Article from Internet, "Camshaft Installation and Degreeing" (no date available).

(List continued on next page.)

*Primary Examiner*—Eric S. McCall
(74) *Attorney, Agent, or Firm*—Nixon & Vanderhye P.C.

(57) ABSTRACT

A measurement platform for an overhead cam shaft type internal combustion engine having at least one piston reciprocable within a cylinder formed in a block; an intake valve and an exhaust valve for the cylinder, wherein intake and exhaust cam lobes on the cam shaft engage upper ends of respective intake and exhaust valve stems, the platform comprising at least one relatively rigid bridge component including a pair of mounting flanges at opposite ends thereof, the mounting flanges having fastener holes aligned with fastener holes in the engine head on opposite sides of the cam shaft, the relatively rigid bridge having a plurality of holes therein adapted to support one or more measuring devices adapted to engage the intake and exhaust cam lobes on the camshaft.

19 Claims, 9 Drawing Sheets

OTHER PUBLICATIONS

Quadrant Scientific, "Camshaft Measurement and Analysis Tool", Nov. 1996.

Camshaft Tech, "How To Avoid The Bumpstick Blues—Choosing The Right Cam", Apr. 1996.

Engine Tech, "How To Make It Work" (no date available).

Popular Hot Rodding, "EssentialOperations—Cam Degreeing", Apr. 1997.

* cited by examiner

CAMSHAFT DEGREEING PLATFORM

RELATED APPLICATIONS

This application is a continuation-in-part application of Ser. No. 08/856,507, filed May 15,1997. U.S. Pat. No. 5,827,954.

TECHNICAL FIELD

This invention relates to a measurement platform device or tool for facilitating the degreeing of a camshaft.

BACKGROUND

In order to determine if a camshaft meets the manufacturer's specifications, a procedure known as camshaft "degreeing" is employed. The procedure determines if, in fact, the valves are opened and closed in the precise, specified manner. This is particularly important where competition engines are concerned, since cylinder pressures/volumes are critical to engine performance. Inaccurate camshafts can rob much needed horsepower from these engines, placing the driver at a real competitive disadvantage.

The problem arises because camshafts may not always meet manufacture specifications. In addition, cam timing can be negatively impacted by tolerance stacking, and/or manufacturer's decisions to target overall performance as a goal rather than racing performance.

As already indicated, cam degreeing procedures are known, and, in fact, there are different ways to degree a camshaft, all of which provide essentially the same information. See, for example, "Essential Operations—Cam Degreeing" by Doc Fromhader in the April 1997 edition of Popular Hot Rodding. See also "How To Hot Rod Small-Block Chevy's" published by HP Books; Copyright 1976; Library of Congress #73-173702. The specific procedures are somewhat complex and need not be described here, except to note that they involve determining crank position, in degrees of rotation from top dead center (TDC), and relative to specific points on the cam shaft, e.g., the point where the cam starts to push the lifter up; where the lifter is at the lowest point of its travel; and the intake centerline. The procedure must be repeated for each lifter (intake and exhaust) for each piston. Currently, the most widely employed technique is to use a single magnetic indicator base holding a single dial indicator to record the various measurements. The base is first located on the engine block such that the dial indicator can be maneuvered into position where the indicator stem will measure the movement of a piston in the cylinder on either side of top dead center. Once top dead center (TDC) has been located, the cam degreeing procedure is commenced, moving the indicator base as necessary to record measurements for each lifter associated with each piston. It will be appreciated that the procedure is both tedious and time consuming. Moreover, the indicator base may move during measurement, or between measurements at a given location, thereby placing the accuracy of the readings into question. Thus, there remains a need for a simple, easy to use, and accurate cam degreeing device or tool which minimizes the number of adjustments and/or tool relocations.

SUMMARY OF THE INVENTION

In accordance with a first exemplary embodiment of this invention, a measurement platform tool is provided which may be temporarily secured in place within the lifter gallery and atop the engine deck of a partly assembled engine. More specifically, the platform is designed to be attached utilizing existing threaded head bolt holes already present in the engine block. Since the pattern of bolt holes is repeated in areas adjacent each cylinder, the measurement platform may be relocated to corresponding positions for each cylinder. For piston and lifter measurements at any one cylinder, however, the platform remains stationary.

The platform itself consists essentially of a relatively thick plate which may be manufactured from any of several suitable materials, with aluminum presently preferred. In addition to the three holes by which the platform is secured to the block, three additional holes are provided. One of these additional holes supports a vertical rod or standard to which a pair of dial indicators can be secured, utilizing conventional adjustable mounting hardware. The remaining two holes are sized and located to vertically align with a pair of lifter substitutes for the intake and exhaust valves associated with a respective cylinder. As explained in greater detail below, the lifter substitutes extend upwardly through the holes in the platform where they are engaged by stems of the first two dial indicators. A third dial indicator is supported on a second vertical standard welded to one of the bolts used to secure the platform to the block. This third dial indicator is used to determine TDC for the piston, and thus, the indicator stem is located to engage the top of the piston as it approaches its upward limit of movement and as it begins its downward movement.

A pair of lifter substitutes are provided which are inserted within the inlet and exhaust lifter bores. The lifter substitutes are spring loaded by a pair of coil springs interposed between the bottom of the platform and the lifter bores within the block. Small washer-like guides may be utilized to keep the springs centered on the lifter rods. The springs are sized to be under compression and to apply a downward force to the lifter substitute rods. This insures that when the cam lobes rotate to a position where the lifter rods would normally descend, the spring bias insures that they do in fact descend and do not have to be pushed downwardly manually to overcome the friction within the bore. The upper ends of the substitute lifter rods have small recesses which allow the dial indicator stems to be centered on the lifter rod substitutes.

With the above arrangement, lifter rod travel for both the inlet and the exhaust lifters as well as piston travel can be measured simultaneously without having to relocate the measurement platform for each.

A conventional degree wheel is required for use with this invention for the cam degreeing procedure, and is normally attached to the front of the crank shaft. A pointing device is also provided for attachment to the block in conventional fashion so that it can locate the degree marks on the degree wheel as the latter rotates. With this apparatus, which may be provided in kit form, cam degreeing procedures can be carried out in a quick, efficient and accurate manner heretofore not available in the prior art.

In an alternative embodiment of the invention, the mechanical dial indicators may be replaced with electronic sensors for use with an electronic degree wheel kit so that the various measurements can be displayed as digital readouts on a control panel.

In a still further advanced version of the invention, a micro-processor may be employed in conjunction with the control panel to measure and record all readings throughout the procedure. A print-out may then be obtained which will display all of the readings and precisely pinpoint the cam degree. Alternatively, the operator could simply press a button on the control panel and the computer would post the accurate cam degree on the control panel or separate monitor screen.

In accordance with this continuation-in-part application, a modified measurement platform tool is provided for use with single or double overhead cam engines. However, it will be appreciated that this tool is also suitable for conventional non-overhead cam engines. This platform tool includes a pair of arcuate bridge components which may be mounted to existing valve cover holes at the front and back of the engine head, with a plurality (for example, three) rods extending between the two bridge components. With this arrangement, dial gauges or electronic indicators can be mounted for sliding movement along the rods extending between the bridge components. For a single overhead cam engine, one of the side rods can be employed and a pair of gauges (mechanical or electronic) can be located one behind the other on the rod (using conventional universal type brackets), directly above the axially spaced intake and exhaust lobes of the single camshaft. A third gauge for measuring piston movement may be mounted in a spark plug hole by means of a special adapter providing direct axis to the top of the piston. Alternatively, depending on the location and orientation of the spark plug holes, this third gauge may also be supported on the bridge component or on one of the rods extending between the bridge components.

For double overhead cam engines, two gauges mounted on the center rod may be used to align the gauges over the respective laterally spaced cam intake and exhaust lobes for a particular cylinder.

For either single or double overhead cam arrangements, it will be appreciated that the gauges may be moved along one or more of the rods as desired to measure intake and exhaust cam lobe movement for each cylinder successively or in any desired order. At the same time, the piston travel gauge can be moved via relocation of the spark plug hole adapter as required.

In an alternative arrangement, a single bridge component can be used, with the gauges mounted directly on the bridge, for measurement of the intake and exhaust cam lobes of one cylinder of a single or double overhead cam engine. The bridge component can then be moved from cylinder to cylinder, using existing valve cover holes.

The platform tool is designed for maximum flexibility and adaptability, so that it has virtually universal applicability to the many different engine designs. In this regard, the bridge components may have additional holes for supporting the linearly extending rods and the mounting flanges may have two or more holes to adjust for different sized heads.

Thus, in accordance with this continuation-in-part application, there is provided a measurement platform tool for an overhead cam shaft type internal combustion engine having at least one piston reciprocable within a cylinder formed in a block; an intake valve and an exhaust valve for the cylinder, wherein intake and exhaust cam lobes on the cam shaft engage upper ends of respective intake and exhaust valve stems, the platform tool comprising at least one relatively rigid bridge component including a pair of mounting flanges at opposite ends thereof, the mounting flanges having fastener holes aligned with fastener holes in the engine head on opposite sides of the cam shaft, the relatively rigid bridge having a plurality of holes therein adapted to support one or more measuring devices adapted to engage the intake and exhaust cam lobes on the camshaft.

In accordance with still another aspect of this invention, there is provided a measurement platform tool assembly for a single or double overhead cam internal combustion engine having a plurality of pistons reciprocable within corresponding cylinders formed in a block, and at least one camshaft having a plurality of intake and exhaust lobes engageable with intake and exhaust valve stems, respectively, the platform assembly comprising a pair of relatively rigid substantially arcuate bridge components, each having mounting flanges and fastener holes sized and arranged to permit fastening of the bridge components to the engine head via existing bolt holes in the head; one or more mounting rods extending between the pair of relatively rigid bridge components; and at least one measurement device slidably and adjustably mounted on at least one of the one or more rods.

In still another aspect, there is provided a method of determining the relationship between a piston and valve intake and exhaust components of an internal combustion engine, comprising the steps of:

a) providing a platform assembly tool comprising at least one relatively rigid bridge component including a pair of mounting flanges at opposite ends thereof, the mounting flanges having fastener holes aligned with fastener holes in the engine head on opposite sides of the cam shaft, the relatively rigid bridge having a plurality of holes therein adapted to support one or more measuring devices adapted to engage the intake and exhaust cam lobes on the cam shaft;

b) mounting at least a pair of measuring devices on the platform tool assembly and arranging the devices to engage intake and exhaust cam lobes, respectively;

c) providing a third measuring device for measuring piston movement; and d) recording measurement data from all three of the measurement devices during a complete stroke of the piston.

Other objects and advantages of the subject invention will become apparent from the detailed description which follows.

BEST MODE FOR CARRYING OUT THE INVENTION

Referring now to FIGS. 1–3 and 5, the measurement platform assembly is shown generally at 2 and includes a relatively thick plate 4, preferably formed of aluminum. The plate has a long straight side 6, a pair of ends 8, 10 and an arcuate cut out portion 12 (conforming to an engine cylinder arc) along the side opposite side 6. Side 6 defines a length dimension of about six inches while ends 8 and 10 define a width dimension of about 4 inches. The plate may have a thickness dimension of about 0.5 inch. It will be appreciated that these dimensions may change depending on engine size, layout, etc.

Figure 5:
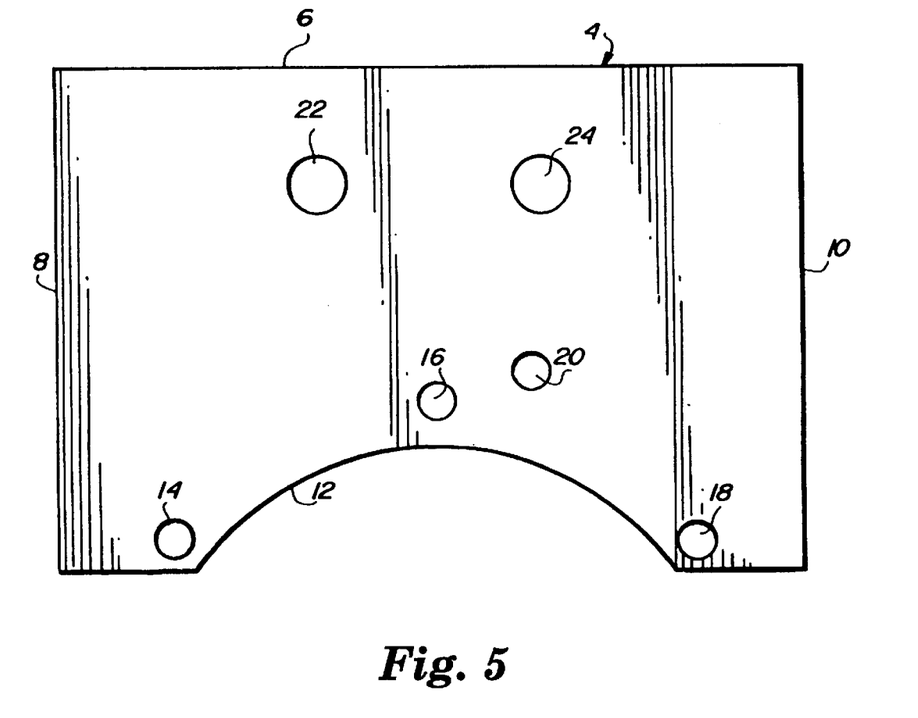
FIG. 5 is a plan view of the measurement platform in accordance with the invention, with standards and dial indicators omitted.
Figure 6:
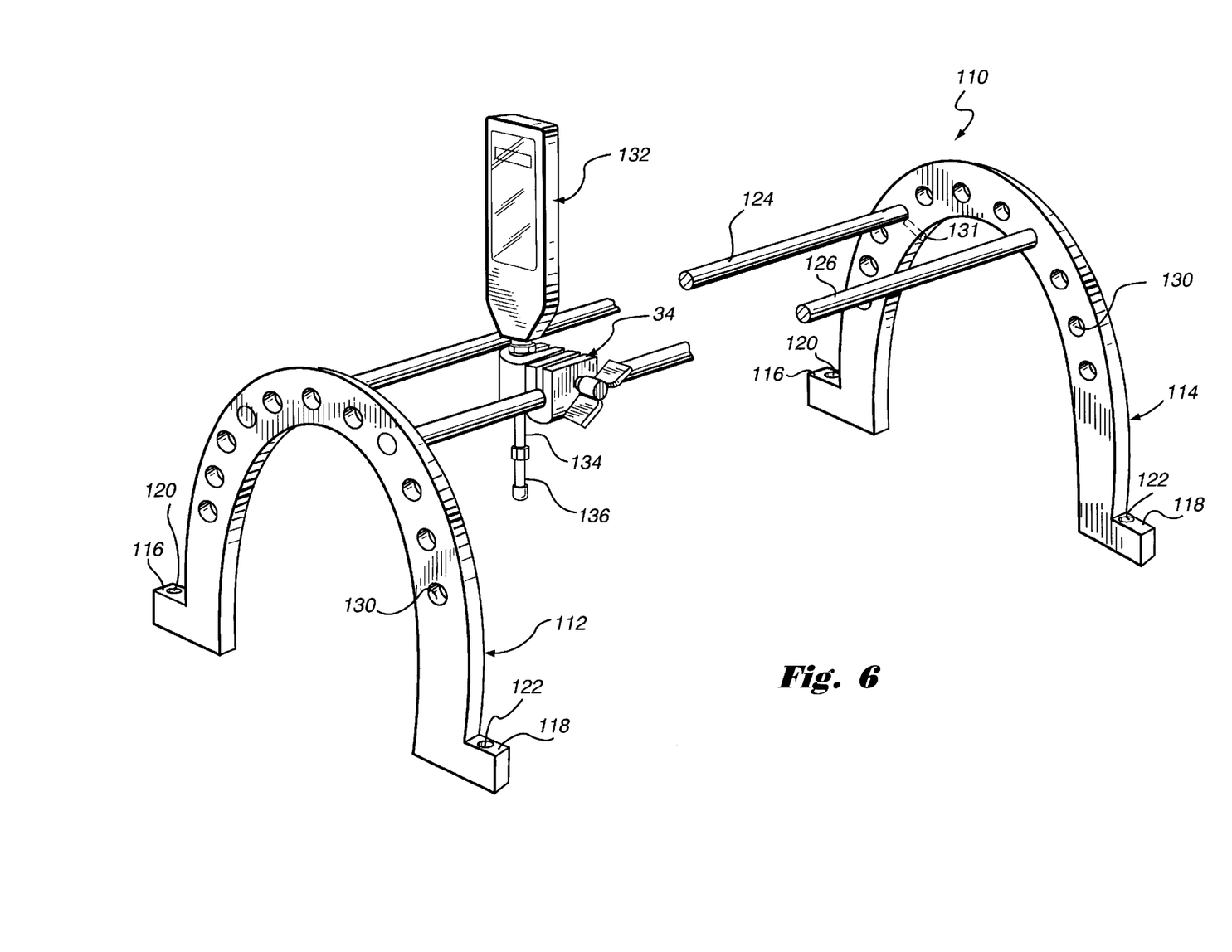
FIG. 6 is a perspective view, with some parts omitted for clarity, of a measurement platform tool in accordance with this invention for use with single or double overhead cam engines.
Figure 7:
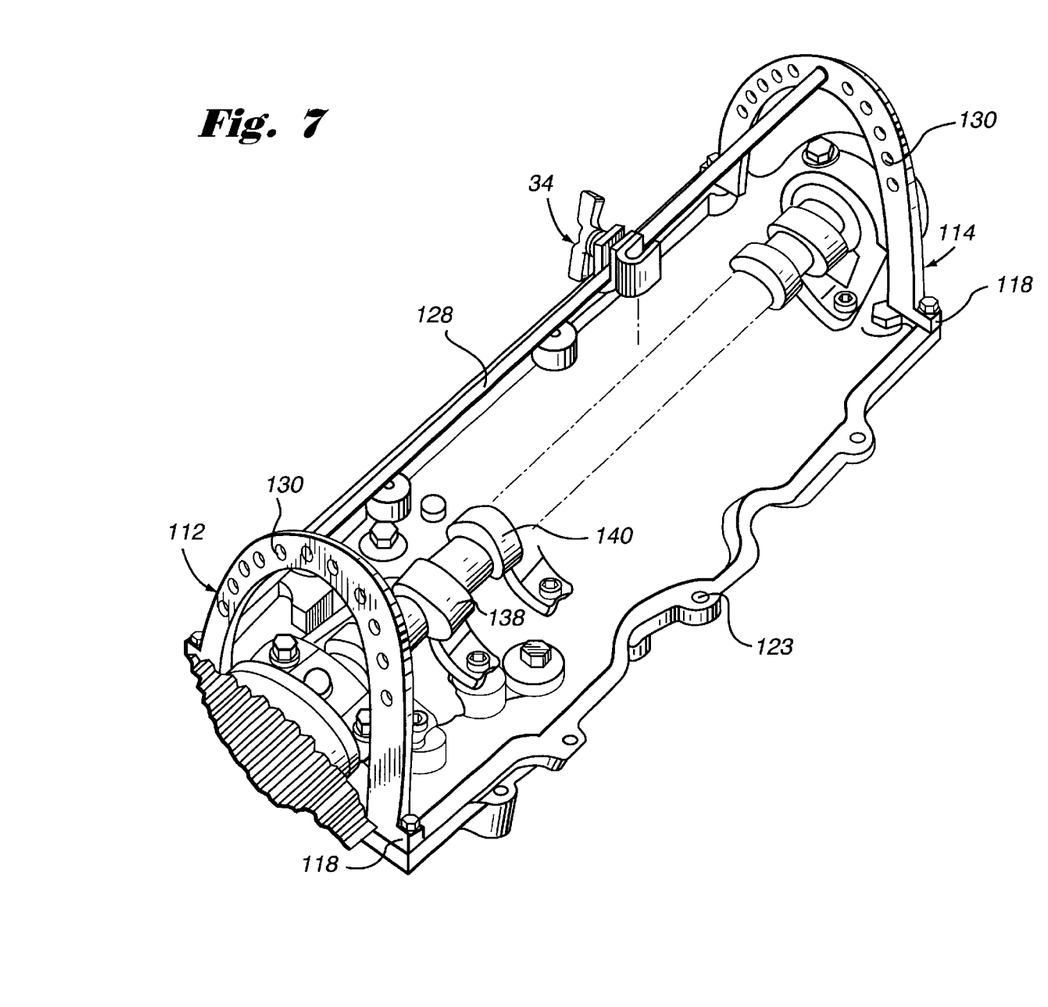
FIG. 7 is a partial perspective view of the platform measurement tool of FIG. 6 installed on a single overhead cam engine, again with component parts removed for clarity.

The plate 4 is provided with three smooth through holes 14, 16 and 18 which are sized and located so that threaded bolts may be used to firmly secure the plate to the engine block, using existing, threaded bolt holes in the head.

The plate 4 is provided with three additional holes 20, 22 and 24. Hole 20 is threaded and receives a threaded rod or standard 26, locked in place by a lock nut 28. Standard 26 serves as a support for a pair of conventional dial indicators 30, 32 using conventional, adjustable support brackets 34, 36, respectively.

A third dial indicator 38 is also supported by a conventional, adjustable mounting bracket 40 on a second vertical standard 42 welded to the head 44 of bolt 46, one of the three such bolts used to secure the plate 12 to the block.

The remaining holes 22, 24 are located so as to be aligned with the inlet and exhaust lifter holes in the engine block adjacent a respective cylinder and piston.

Figure 4:
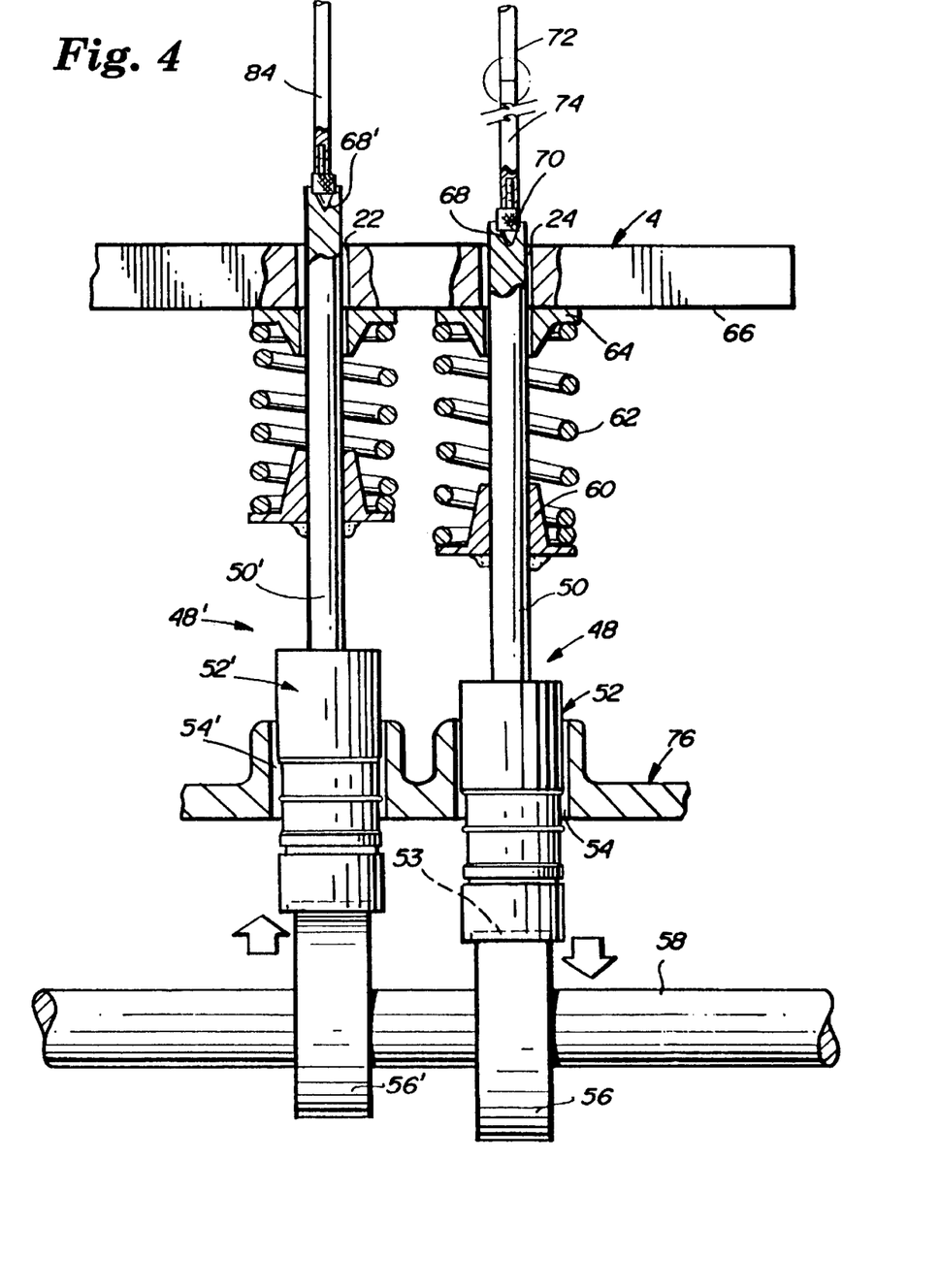
FIG. 4 is an enlarged detail, partly in section, illustrating the manner in which substitute lifters in accordance with the invention engage lobes of an engine camshaft at their lower ends, and dial indicator stems at their upper ends.

The device in accordance with this invention also includes a pair of identical lifter rod substitutes 48 and 48', only one of which need be described in detail. Specifically, as best seen in FIG. 4, the lifter rod substitute 48 includes a rod 50 welded to a dummy lifter 52. The latter may include a UHMW or like material "button" 53 recessed in its lower end where it engages the cam lobe so as to minimize any scuffing of the lobe. The lifter body has similar dimensions to a real lifter, and is thus sized to slide within the engine block bore 54. The lower end of the lifter body engages a cam lobe 56 of the camshaft 58, thus moving up and down as the camshaft rotates.

The rod 50 supports a centering washer or guide 60 which is welded thereto as best seen in FIG. 4. The washer 60 supports a coil spring 62 which is centered at its upper end by a second, loosely mounted washer 64. The washer 60 is located such that the lifter 48 is biased downwardly when the substitute lifter is interposed between the camshaft 58 and the lower side 66 of plate 12. This insures that the substitute lifter will descend within the bore 54 when the cam lobe rotates to its low side.

Figures 3, 4A:
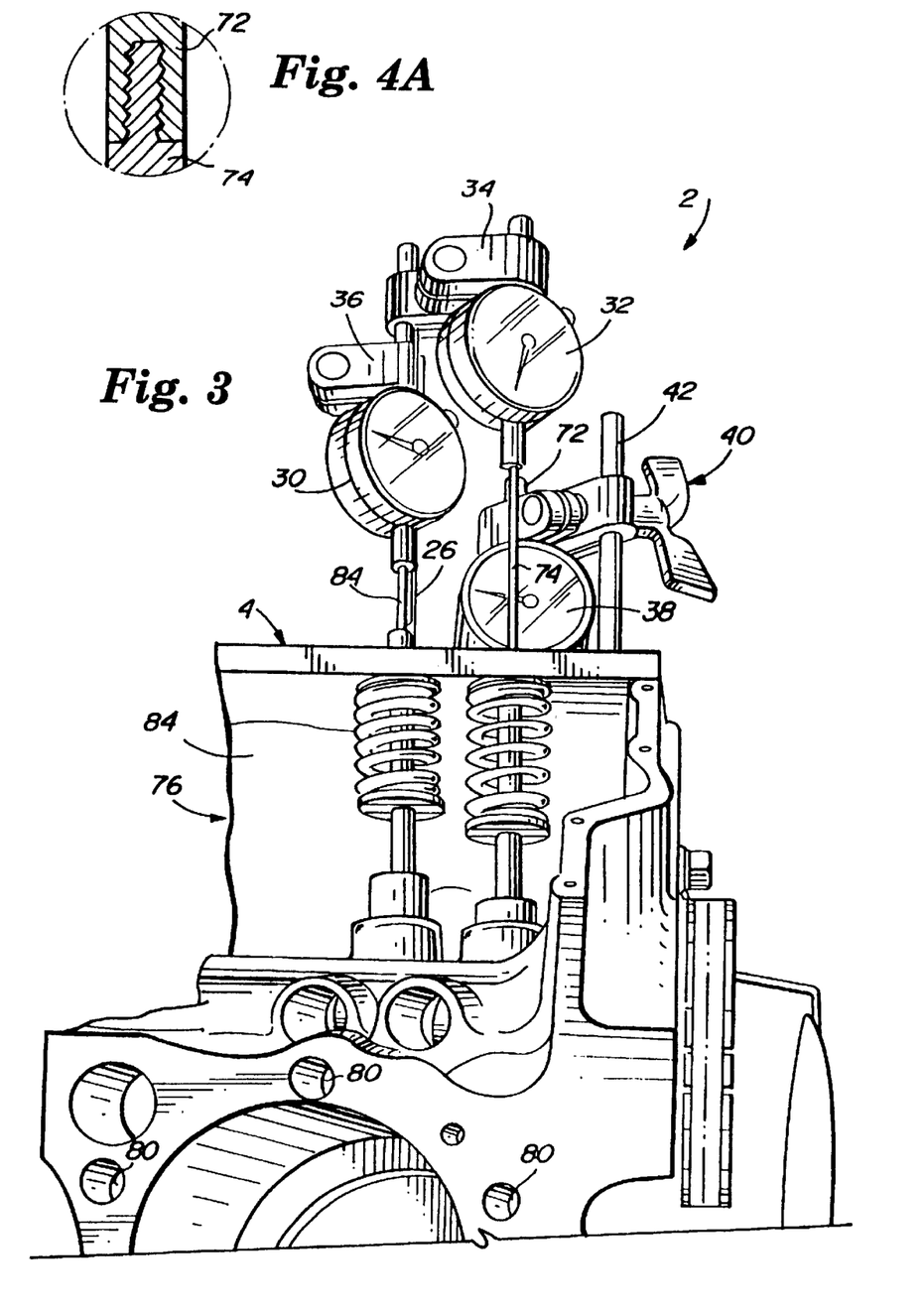
FIG. 3 illustrates the cam degreeing platform of FIG. 1, taken from still another perspective taken from the left side of the block as viewed in FIG. 1.
FIG. 4A is an enlarged detail taken from FIG. 4.

The upper end of rod 50 is formed with a conical recess 68 which is adapted to receive the lower end 70 of the stem 72 of dial indicator 32. In order to have both gauges 30, 32 mounted on the same standard 26, it may be necessary to add an extension 74 threaded to the stem 72 as best seen in FIGS. 4 and 4A.

Figure 1:
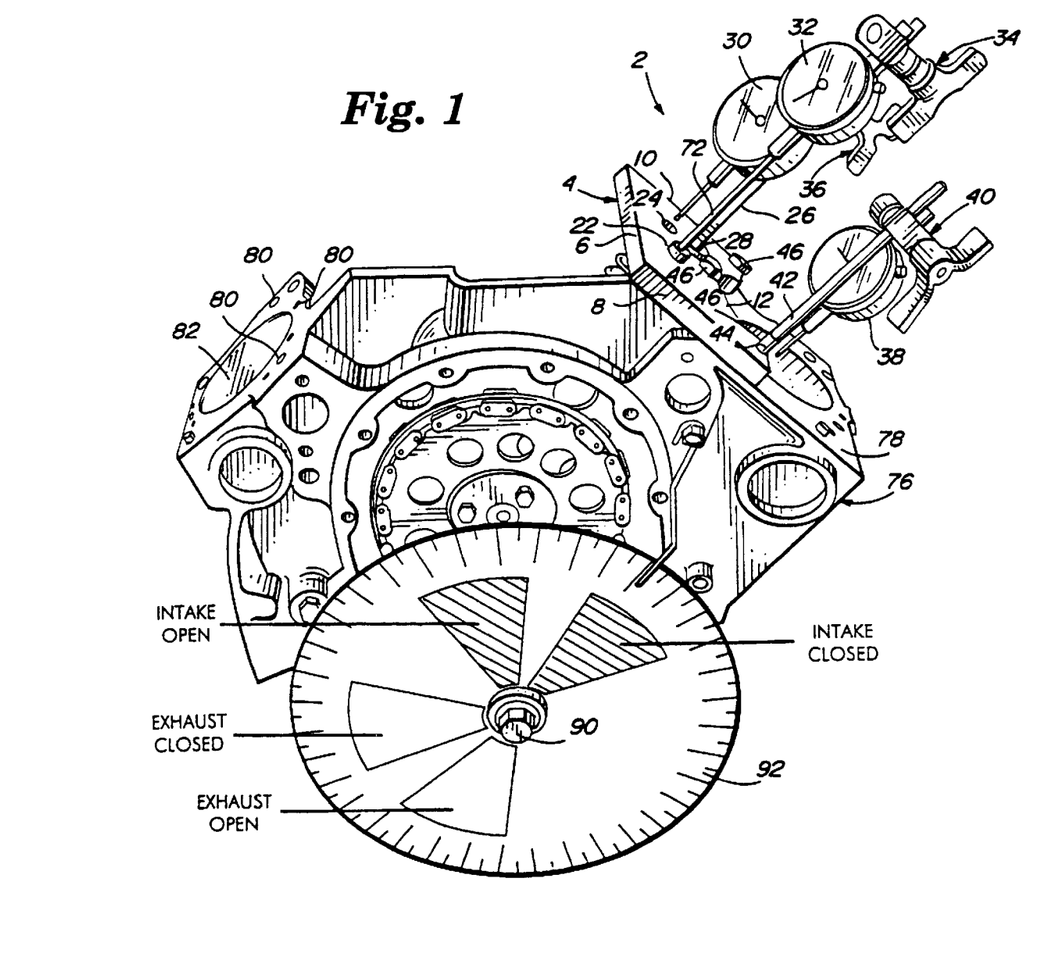
FIG. 1 is a front, top perspective view of the camshaft degreeing platform in accordance with this invention, mounted on a engine block (with the head removed) that has been cut behind the forward pair of cylinders.
Figure 2:
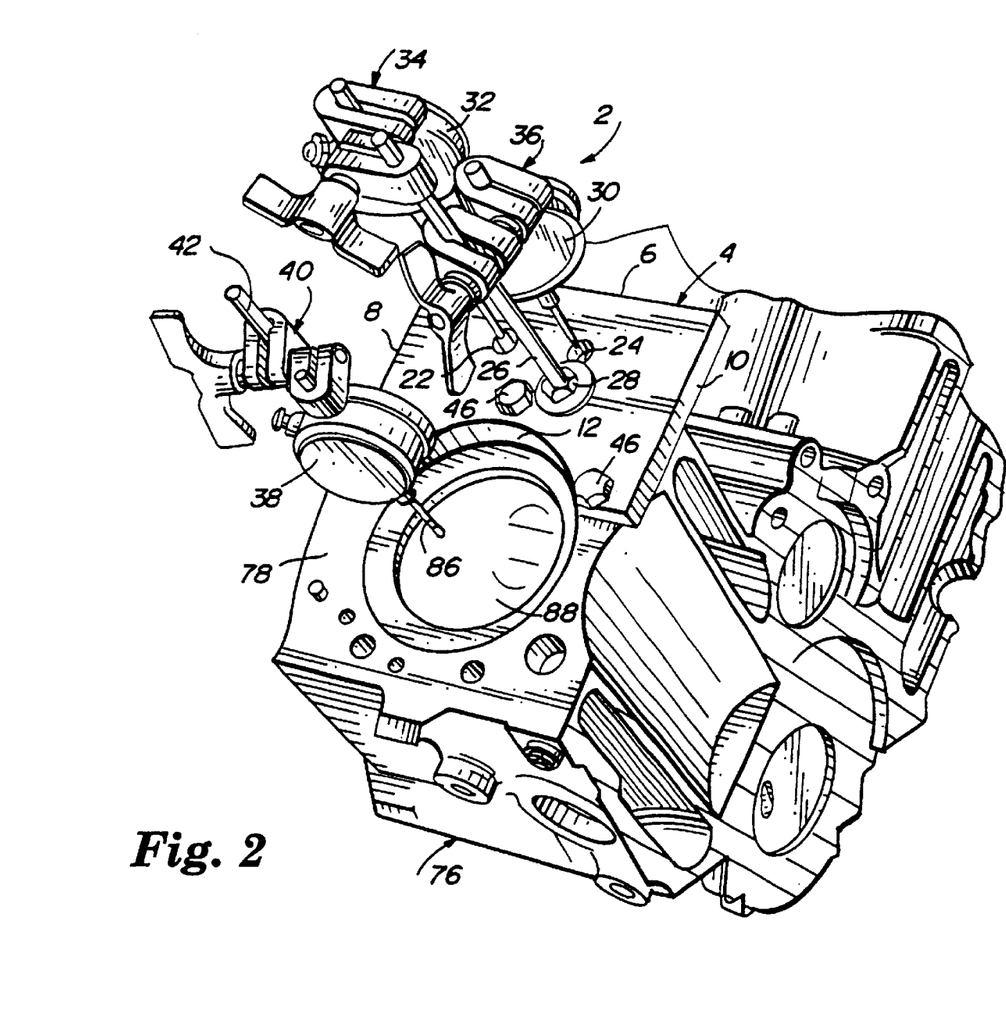
FIG. 2 illustrates the cam degreeing platform of FIG. 1, taken from a rear, top perspective.

In use, the plate 12 is secured to the head 76 of the engine as best seen in FIGS. 1 and 2. Bolts 46 are utilized to fasten the plate 12 to the block, using threaded bolt holes already formed in the block and used normally to secure the head (not shown) to the block along the surface 78. See, for example, similarly threaded head bolt holes 80 adjacent the cylinder 82 on the left side of the engine block as viewed in FIGS. 1 and 3. The lifters 48 and 50 are then located within the lifter gallery 84, with rods 50 and 50! located within the lifter bores 54 and 54! such that the respective lifters 52 and 52! engage cam lobes 56 and 56!. The lifter substitutes are installed so that the upper ends of the rods 50 and 50! extend through the respective holes 24 and 22 in the plate 12. The indicators 30 and 32 are then located along the vertical standard 26, utilizing the adjustable brackets 34, 36 such that the spring loaded stems 74 and 84 are seated within the recesses 68 and 68' of the rods 50, 50', respectively. It should be noted here that washers may be welded or otherwise secured to the upper ends of rods 50 and 50!, after insertion through the holes 22, 24 in order to retain the substitute lifters in a loosely assembled relationship with the platform 4. Dial indicator 38 is then located along the vertical standard 42 such that its stem 86 is located to engage the top of a piston 88 as it approaches top dead center and as it moves away from top dead center. If desired, the stem 86 may include an extension to enable measurement of the piston through its full range of travel.

With the dial indicators 30, 32 and 38 set up in the appropriate manner, the engine crank shaft can be rotated by means of a wrench (not shown) engaging the bolt head 90, best seen in FIG. 1. In order to carry out the camshaft degreeing procedure, an angle or degree plate 92 is typically secured by means of the bolt head 90 to the engine block for the purpose of illustrating and/or measuring the degrees of rotation of the camshaft. The plate 92 has degree markings about the full 360 E periphery thereof, with further indicia delineating arcs through which noted valve motions occur. Such plates are per se known in the art.

As previously indicated, cam degreeing procedures are also well known, noting however, that the procedures may be carried out more quickly and more accurately with the measurement platform disclosed herein. Significantly, movement of the platform is minimized to the point where all measurement for a given cylinder are taken with the platform in a secure, stationary position. Relocation is required only to take measurements for a next cylinder and associated lifters, and this relocation is done quickly and easily simply by removing the bolts 46, relocating the assembly and reinstallation of the same bolts.

It will be appreciated that the invention is not limited to the specific mechanical measurement system described above. For example, the dial indicators may be replaced by electronic gauges and the degree wheel may be replaced by an electronic degree wheel kit containing an electromagnetic degree wheel and an electronic reader/counter. A control panel would also be included in this more advanced embodiment of the invention, so that the various measurements can be displayed on the control panel. An electronic gauge suitable for this application is a Mitutoyo electronic micrometer head Model No. 19705A63.

An even more advanced version of the application includes a microprocessor connected to the control panel which makes use of specially designed software that evaluates the data input and precisely pinpoints the cam degree. One suitable software system is sold under the name Meter Boss available from Teramar Group, Inc. of El Paso, Tex.

For the convenience of the user, it is anticipated that the measurement platform assembly of this invention will be provided in kit form, each of which will provide all of the components required to perform the cam degreeing procedure, depending on whether the mechanical, electronic or electronic/computer versions are selected.

A brief description of a typical procedure, utilizing the basic mechanical components of the invention follows below.

With a plate 4 and gauges 30, 32 and 38 in place, turn the crankshaft until the dial indicator gauge 38 indicates that TDC has been found. Adjust the degree wheel 92 to coincide with this reading of TDC. Preload the intake substitute valve lifter gauge about 0.010 (assume indicator 32 for purposes of this example). Rotate the crankshaft in normal direction of operation and observe the indicator, watching the point of maximum lift. Make a note of the degree wheel reading at this point of maximum lift. Rotate the crankshaft exactly one turn in the same direction until the pointer on the degree wheel again aligns with your previous notation. This position places the substitute lifter 48 in the midpoint of the clearance section of the cam lobe 56. The cam has now turned exactly 180 E. The cam 58 will turn one revolution for every two crank revolutions. Without changing the indicator preload, set the dial indicator face to zero. Again rotate the crankshaft in the direction of the running rotation and observe the dial indicator. When it shows that the lifter substitute 48 has raised an amount equivalent to the checking clearance on the cam spec sheet, record the degree wheel reading. This will be a certain number of degrees BTDC. Continue to rotate the crankshaft in the same direction until the lifter substitute 48 has risen up in its bore and fallen back again as it followed the opening and closing flanks of the cam lobe. Watch again for the indicator to reach the checking clearance. Record the degree wheel reading as the number of degrees between the pointer and BDC. Finally, add 180E to the two previous degree wheel readings to get duration of opening measured at the checking clearance. Repeat this process several times to eliminate the possibility of errors. The user must then repeat this process with the exhaust valve lifter substitute 48', and then move to the next cylinder.

With the electronic version of the invention, the implementation is the same as described above, but all readings and measurements are displayed as digital read-outs on the control panel.

With the more advanced electronic/computer kit, the crankshaft is rotated until top dead center is accomplished, and the crankshaft is then further rotated two full revolutions. The computer in the control panel will then measure and record all readings throughout the procedure. A print-out will reveal these readings for physical location of the correct cam degree, or, alternatively, the operator can simply press a button the control panel and the computer will post the accurate cam degree on its digital read-out.

With reference now to FIGS. 6–12, an alternative embodiment of the subject invention is disclosed which relates to a measurement platform tool for single or double overhead cam engines. Specifically, a bridge assembly 110 is provided which includes a pair of substantially arcuate (or elliptical, or rectangular) bridge components 112 and 114, each of which is provided with horizontal mounting flanges 116, 118 at opposite ends thereof. These flanges have holes 120, 122 formed therein which align with existing threaded valve cover holes in the engine head, on opposite sides of the overhead camshaft (see FIG. 7). Additional holes may be provided to accommodate different engine designs.

Figure 9:
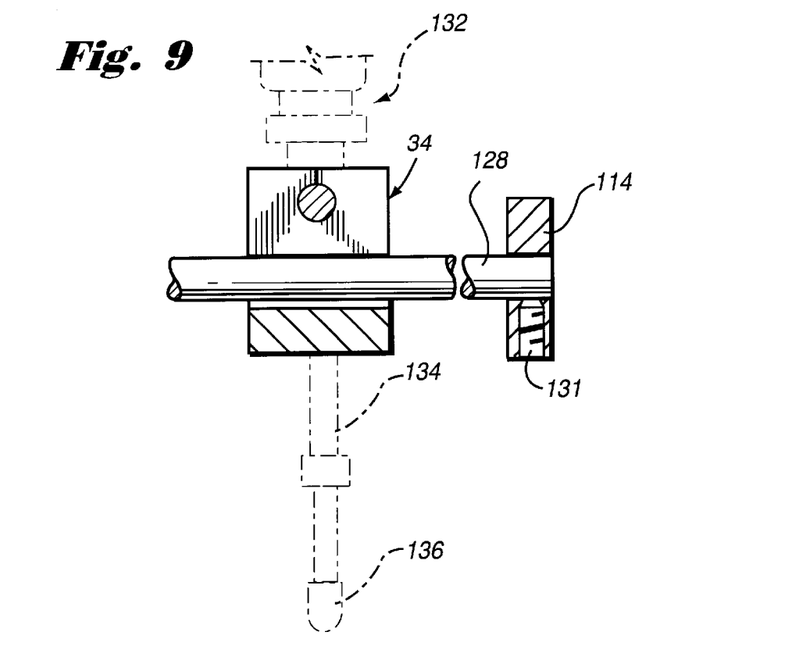
FIG. 9 is a detail, partly in section, illustrating the manner in which the longitudinally extending rods of the measurement platform tool assembly are secured to the bridge components.

Bridge components 112 and 114 are preferably formed of aluminum, with a width of about 1½ inch, and a thickness of about ⁵⁄₁₆ inch. Other suitable materials may be employed as well, and the dimensions of the bridge components may be varied to suit specific applications. The bridge components 112 and 114 may be connected by longitudinally extending, substantially parallel rods 124, 126 and 128, the uniform length of which is chosen so that bridge components 112 and 114 may be secured in the first and last pair of valve cover holes. Each rod 124 is made of stainless steel with a diameter of approximately ⅜ inch. The rods fit within round holes 130 in the bridge components, and are secured therein by set screws 131 (see FIGS. 6 and 9). As shown, each bridge component may be provided with several such mounting holes 130 for increased flexibility and adaptability of the system.

Figure 8:
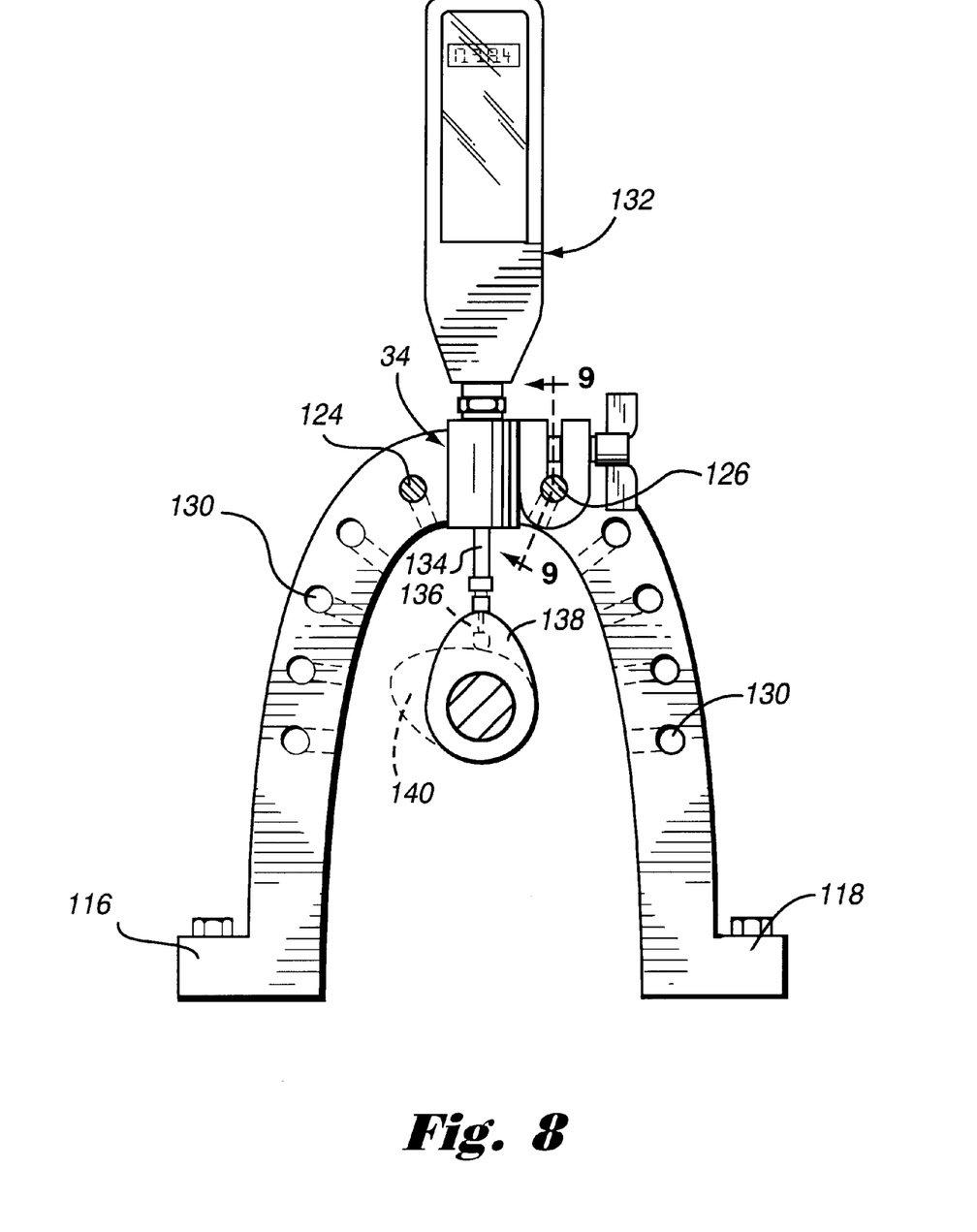
FIG. 8 is a front elevation of a platform measurement tool in accordance with this invention, illustrating the manner in which a measuring tool engages the cam lobes of a single overhead cam shaft.

With the arrangement as shown, a pair of electronic gauges 132 (one shown in each of FIGS. 6 and 8 for the sake of clarity), such as the previously described Mitutoyo Model No. 19705A63 micrometers, can be slidably mounted on one or more of the rods 124, 126 and 128, depending on engine type. The gauges can be mounted using brackets such as those shown at 34 in FIGS. 1–5, which receive, for example, the barrel portion 134 of the electronic gauge 132. Other conventional brackets with or without additional fasteners may be used as well.

For single overhead cam engines, two such gauges 132 can be located one behind the other on, for example, rod 126 (see FIG. 8) over a cylinder, with the gauge stems 136 (one shown in FIG. 8) aligned with and engaging the intake and exhaust cam lobes 138, 140 which, in turn, engage the intake and exhaust valve stems (not shown) for that cylinder. By mounting the gauge 132 on the side rod 126, the normal offset created by the bracket 34 causes the gauge stem 136 to be located in vertically aligned relationship with the camshaft axis. Alternatively, the second gauge can be mounted on the other side rod 124 for alignment with the other of the cam lobes. For double overhead cam engines, the pair of gauges 132 may be mounted on the center rod 128 (note the location of bracket 34 in FIG. 7) so as to align with the respective laterally spaced intake and exhaust lobes of the two laterally spaced camshafts (not shown). Those skilled in the art will appreciate that various mounting and alignment schemes are possible, depending on the specific type of gauge, mounting bracket, engine cam arrangement, etc.

It will also be appreciated that the gauges 132 can be loosened and moved to the next or any other cylinder as the measurements for each cylinder are completed.

Figure 10:
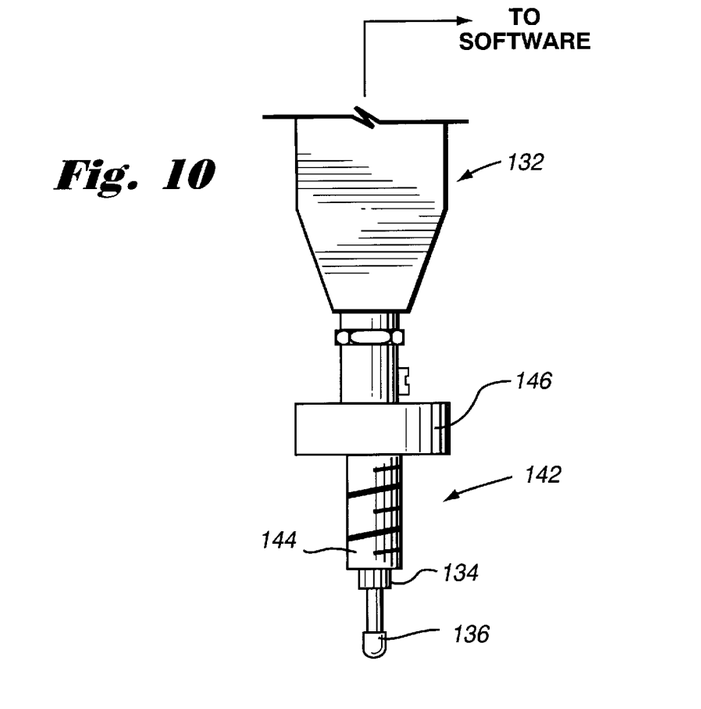
FIG. 10 is a partial side elevation illustrating a spark plug hole adapter for use with a piston travel measurement gauge in accordance with the invention.

For both single and double overhead cam engines, piston movement is also measured, using a spark plug hole adapter 142 shown in FIG. 10. This adapter has an exteriorly threaded portion 144 and an enlarged head 146. The adapter is also bored, so that the stem of the gauge (e.g., stem 136 of a gauge 132) can be passed through the bore, with sufficient axial length to remain fully engaged with the top of the piston during the full piston stroke, once the adapter 142 has been threaded into the existing spark plug hole. For some engines, depending on the location and orientation of the spark plug hole, the piston measurement gauge can be supported on one of the rods 124, 126 or 128, absent sufficient space in the vicinity of the spark plug hole.

It will be appreciated that one of the bridge components 112 or 114 can also be used alone, without the rods 124, 126 and 128. In such case, the gauge mounting brackets 34 are supported by pins (not shown) or other suitable hardware in the holes 130 in the bridge component normally used for the rods 124,126 or 128, and the bridge component is located over the cylinder to be measured. The bridge component may then be moved to any one or all of the remaining cylinders, one at a time.

The cam degreeing procedure used with this further embodiment of the invention is as previously described. It will be appreciated, however, that the platform tool assemblies as described herein may be employed to generally determine and/or study the interrelationship of movements of the pistons vis-a-vis the intake and exhaust valve stems for reasons other than cam degreeing.

As already indicated, this platform tool is also capable of calibrating all aspects of valve timing in conventional motors, i.e., non-overhead cam versions. The accessory bridge is attached to the cylinder head of an assembled motor with all of its valve components in place. This includes the cam, lifters, pushrods, rocker arms valves and spring assemblies. The gauge is installed to come into direct contact with either the valve itself or the rocker arm as it contacts the uppermost part of the valve stem. Then all measurements are completed as previously described.

It should also be appreciated that there is no fixed procedure with respect to which longitudinally extending support rod is to be used for supporting the measurement gauge(s) in any given application. Of significance is the fact that, with the present invention, various gauges can be mounted at various locations directly on (or supported between) the bridge components, depending on gauge and bracket selection, engine type; etc. In other words, the platform tool assembly is intended to provide maximum flexibility and applicability in a simple and cost effective manner.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A measurement platform tool for an overhead cam shaft type internal combustion engine having at least one piston reciprocable within a cylinder formed in a block; an intake valve and an exhaust valve for said cylinder, wherein intake and exhaust cam lobes on said cam shaft engage upper ends of respective intake and exhaust valve stems, the platform tool comprising:

at least one relatively rigid bridge component including a pair of mounting flanges at opposite ends thereof, said mounting flanges having fastener holes aligned with fastener holes in said engine block on opposite sides of said cam shaft, said relatively rigid bridge component having a plurality of holes therein adapted to support one or more measuring devices adapted to engage the intake or exhaust cam lobes on said camshaft; and wherein the tool is in combination with a spark plug hole adapter threadably engageable with a spark plug hole in the engine, said adapter having a through bore for receiving a stem of a piston stroke measurement device supported on said relatively rigid bridge component.

2. The tool of claim 1 wherein said piston stroke measurement device comprises an electronic micrometer.

3. A measurement platform assembly tool for internal combustion engine having a plurality of pistons reciprocable within corresponding cylinders formed in a block, and at least one camshaft having a plurality of intake and exhaust lobes engageable with intake and exhaust valve stems, respectively, the platform assembly tool comprising:

a pair of relatively rigid substantially arcuate bridge components, each having mounting flanges and fastener holes sized and arranged to permit fastening of said bridge components to the engine head via existing valve cover holes in the head;

one or more mounting rods extending between said pair of relatively rigid bridge components; and at least one measurement device slidably and adjustably mounted on at least one of said one or more mounting rods.

4. The platform assembly tool of claim 3 wherein said at least one measurement device comprises a dial indicator.

5. The platform assembly tool of claim 3 wherein said measurement device comprises an electronic micrometer.

6. The platform assembly tool of claim 3 in combination with a spark plug hole adapter adapted for threaded engagement with a spark plug hole in the engine, said adapter having a through bore for receiving a stem of a piston stroke measurement device supported on one of said one or more mounting rods.

7. The platform assembly tool of claim 6 wherein said piston stroke measurement device comprises a dial indicator.

8. The platform assembly tool of claim 6 wherein said piston stroke measurement device comprises an electronic micrometer.

9. The platform assembly tool of claim 3 wherein said one or more mounting rods comprises three rods, a center one of which is adapted to be in substantial vertical alignment with a cam shaft of a single overhead cam engine.

10. The platform assembly tool of claim 9 wherein two remaining rods on either side of said center rod are adapted to align substantially with laterally spaced camshafts of a double overhead cam engine.

11. The platform assembly tool of claim 3 wherein said bridge components are aluminum.

12. The platform assembly tool of claim 3 wherein said one of more mounting rods are slidably received within holes in said bridge components and secured therein by set screws.

13. The platform assembly tool of claim 3 wherein said at least one measurement device is mounted on said at least one of said rods by an adjustable bracket.

14. A method of determining a relationship between a piston and valve intake and exhaust components of an internal combustion engine, comprising the steps of:

a) providing a platform assembly tool comprising at least one relatively rigid bridge component including a pair of mounting flanges at opposite ends thereof, said mounting flanges having fastener holes aligned with fastener holes in a head of said internal combustion engine on opposite sides of a cam shaft, said relatively rigid bridge having a plurality of holes therein adapted to support one or more measuring devices adapted to engage the intake and exhaust cam lobes on said camshaft;

b) mounting at least a pair of measuring devices on said platform tool assembly and arranging said devices to engage intake and exhaust cam lobes, respectively;

c) providing a third measuring device for measuring piston movement; and d) recording measurement data from all three of said measurement devices during a complete stroke of said piston.

15. The method of claim 14 including carrying out steps (b), (c) and (d) for each piston and associated valve intake and exhaust components.

16. The method of claim 14 wherein, in step (a), a pair of bridge components are mounted on the engine head, with a plurality of longitudinally extending rods secured between said pair of bridge components, and further wherein at least two measuring devices are mounted on one or more of said rods.

17. The method of claim 15 wherein the third measuring device is mounted in a spark plug adapter which is designed for threaded engagement with an existing spark plug hole in the engine.

18. A measurement platform tool for an overhead cam shaft type internal combustion engine having at least one piston reciprocable within a cylinder formed in a block; an intake valve and an exhaust valve for said cylinder, wherein intake and exhaust cam lobes on said cam shaft engage upper ends of respective intake and exhaust valve stems, the platform tool comprising:

at least one relatively rigid bridge component including a pair of mounting flanges at opposite ends thereof, said mounting flanges having fastener holes aligned with fastener holes in said engine block on opposite sides of said cam shaft, said relatively rigid bridge having a plurality of mounting holes therein arranged on opposite sides thereof and above said cam shaft for supporting one or more measuring devices at selected locations about said bridge component; said tool further comprising a spark plug hole adapter adapted for threaded engagement with a spark plug hole in the engine, said spark plug hole adapter having a through bore for receiving a stem of a piston stroke measurement device supported on said relatively rigid bridge component.

19. The tool of claim 18 wherein said piston stroke measurement device comprises an electronic micrometer.

* * * * *